(12) United States Patent
Oufnac et al.

(10) Patent No.: US 9,380,804 B2
(45) Date of Patent: Jul. 5, 2016

(54) SYSTEMS AND METHODS FOR FOOD PRODUCT EXTRUSION

(71) Applicant: The Hillshire Brands Company, Chicago, IL (US)

(72) Inventors: David S. Oufnac, Chicago, IL (US); Larry Scott, Chicago, IL (US); Brenda Marie Dismore, Somonauk, IL (US); Timothy A. Stubbs, Glenview, IL (US)

(73) Assignee: The Hillshire Brands Company, Chicago, IL (US)

( * ) Notice: Subject to any disclaimer, the term of this patent is extended or adjusted under 35 U.S.C. 154(b) by 258 days.

(21) Appl. No.: 13/941,329

(22) Filed: Jul. 12, 2013

(65) Prior Publication Data

US 2014/0023752 A1    Jan. 23, 2014

Related U.S. Application Data (60) Provisional application No. 61/670,996, filed on Jul. 12, 2012.

(51) Int. Cl.
  *A23P 1/12*     (2006.01)
  *A23L 1/317*    (2006.01)
  (Continued)

(52) U.S. Cl.
  CPC ............. *A23L 1/3172* (2013.01); *A23L 1/0067* (2013.01); *A23L 1/0079* (2013.01); *A23L 1/3103* (2013.01);
  (Continued)

(58) Field of Classification Search
  CPC ............. A23L 1/00; A23L 1/31; A23L 1/315; A23L 1/317–1/3175; A23L 1/0047; A23L 1/0067; A23L 1/0076–1/0079; A23L 1/3103; A23L 1/31409; A23P 1/081; A23P 1/12–1/125; A22C 11/02–11/0218; A22C 2013/002–2013/0023; A22C 2013/0046; A22C 2013/005
  USPC ........ 426/105, 302, 513, 516; 425/376.1, 380
  See application file for complete search history.

(56) References Cited

U.S. PATENT DOCUMENTS 3,306,754 A   2/1967  Kielsmeier et al.
3,399,423 A   9/1968  Kielsmeier et al.
(Continued)

FOREIGN PATENT DOCUMENTS

EP         024790 B1    9/1982
EP         0258037 A2   3/1988
(Continued)

OTHER PUBLICATIONS

Townsend Further Processing, "QX System" brochure, copyright date of 2010, 12 pages.
(Continued)

*Primary Examiner* — Drew Becker
(74) *Attorney, Agent, or Firm* — Duane Morris LLP (57) ABSTRACT

A system for producing food products may include an inner tube configured to extrude a first component, and an outer tube provided about the inner tube to define an annular space through which a second component is extruded, the inner and outer tubes (alone or in conjunction with a nozzle or other extrusion mechanism defining an outlet. Additionally, a collagen head can be configured to apply a layer of collagen gel over the second component. The inner and outer tubes are sized, and flow rate may be configured such that an initial diameter of the first component exiting the outlet is substantially smaller than a final diameter of the first component, and an initial thickness of the second component exiting the outlet is substantially greater than a final thickness of the second component.

3 Claims, 5 Drawing Sheets (51) Int. Cl.
*A23L 1/00* (2006.01)
*A23L 1/315* (2006.01)
*A23L 1/31* (2006.01)
*A22C 13/00* (2006.01)

(52) U.S. Cl.
CPC ............ *A23L 1/3152* (2013.01); *A23L 1/3157* (2013.01); *A23L 1/3175* (2013.01); *A23P 1/125* (2013.01); *A22C 2013/0023* (2013.01)

(56) References Cited

U.S. PATENT DOCUMENTS

| | | | |
|---|---|---|---|
| 3,499,766 A * | 3/1970 | Scharschmidt | A21C 11/16 426/249 |
| 3,511,669 A | 5/1970 | Swartz et al. | |
| 3,563,764 A | 2/1971 | Posegate | |
| 3,622,353 A | 11/1971 | Bradshaw et al. | |
| 3,739,427 A | 6/1973 | Niedecker | |
| 3,751,202 A | 8/1973 | Coleman et al. | |
| 3,752,618 A | 8/1973 | Moreland | |
| 3,767,821 A | 10/1973 | Deacon et al. | |
| RE28,281 E | 12/1974 | Bridgeford | |
| 4,309,450 A | 1/1982 | Seibert | |
| 4,377,187 A | 3/1983 | Chiu | |
| 4,377,606 A | 3/1983 | Chiu | |
| 4,404,229 A | 9/1983 | Treharne | |
| 4,442,868 A | 4/1984 | Smith et al. | |
| 4,504,500 A | 3/1985 | Schneck et al. | |
| 4,505,939 A | 3/1985 | Chiu | |
| 4,539,210 A | 9/1985 | O'Connell et al. | |
| 4,579,744 A * | 4/1986 | Thulin | A21C 9/06 425/133.1 |
| 4,609,559 A | 9/1986 | Nicholson | |
| 4,697,505 A * | 10/1987 | Brewer | A21C 11/16 425/376.1 |
| 4,715,803 A | 12/1987 | Koppa | |
| 4,731,906 A | 3/1988 | Matthews et al. | |
| 4,748,031 A * | 5/1988 | Koppa | A21C 3/04 426/102 |
| 4,867,204 A | 9/1989 | Ellis et al. | |
| 4,905,587 A | 3/1990 | Smithers | |
| 4,921,714 A * | 5/1990 | Matthews | A22C 7/0007 426/105 |
| 4,949,430 A | 8/1990 | Stanek | |
| 4,958,412 A | 9/1990 | Stanek | |
| 5,030,464 A | 7/1991 | Hansen et al. | |
| 5,185,189 A | 2/1993 | Stenger et al. | |
| 5,219,002 A | 6/1993 | Stenger et al. | |
| 5,238,442 A | 8/1993 | Townsend | |
| 5,270,067 A | 12/1993 | Underwood et al. | |
| 5,271,948 A | 12/1993 | Boni et al. | |
| 5,277,857 A | 1/1994 | Nicholson et al. | |
| 5,417,992 A | 5/1995 | Rizvi et al. | |
| 5,437,879 A | 8/1995 | Kabse et al. | |
| 5,484,001 A | 1/1996 | Gray | |
| 5,492,706 A | 2/1996 | Cockings et al. | |
| 5,514,400 A | 5/1996 | Gray | |
| 5,518,036 A | 5/1996 | Demasters et al. | |
| 5,549,943 A | 8/1996 | Vicik | |
| 5,554,401 A | 9/1996 | Alexander et al. | |
| 5,573,455 A | 11/1996 | Barilli | |
| 5,599,570 A | 2/1997 | Stribling | |
| 5,686,128 A | 11/1997 | Tracy et al. | |
| 5,705,214 A | 1/1998 | Ito et al. | |
| 5,716,656 A | 2/1998 | Stribling | |
| 5,731,022 A | 3/1998 | Cummins | |
| 5,747,124 A | 5/1998 | Pophusen et al. | |
| 5,794,779 A | 8/1998 | Weinheimer et al. | |
| 5,795,605 A | 8/1998 | Morgan et al. | |
| 5,811,162 A | 9/1998 | Hammer et al. | |
| 5,882,711 A | 3/1999 | Onoguchi et al. | |
| 5,888,130 A | 3/1999 | Weinheimer et al. | |
| 5,888,131 A | 3/1999 | Kobussen et al. | |
| 5,928,705 A * | 7/1999 | Matthews | A22C 11/029 426/105 |
| 5,928,738 A | 7/1999 | Auf Der Heide et al. | |
| 5,951,390 A * | 9/1999 | Kobussen | A22C 7/0007 425/133.1 |
| 5,951,943 A | 9/1999 | Auf Der Heide et al. | |
| 5,992,345 A | 11/1999 | Lange et al. | |
| 5,993,868 A | 11/1999 | Townsend | |
| 6,033,618 A | 3/2000 | Gord et al. | |
| 6,042,466 A * | 3/2000 | Matthews | A22C 7/0007 425/133.1 |
| 6,048,917 A | 4/2000 | Hammer et al. | |
| 6,059,646 A | 5/2000 | Bindels et al. | |
| 6,089,845 A | 7/2000 | Morgan et al. | |
| 6,103,269 A | 8/2000 | Wunderlich et al. | |
| 6,183,799 B1 | 2/2001 | Wu et al. | |
| 6,194,040 B1 | 2/2001 | Delius et al. | |
| 6,235,302 B1 | 5/2001 | Mans et al. | |
| 6,251,452 B1 | 6/2001 | Weinstein et al. | |
| 6,306,446 B1 | 10/2001 | Matthews et al. | |
| 6,331,104 B1 | 12/2001 | Kobussen et al. | |
| 6,419,968 B1 | 7/2002 | Wang et al. | |
| 6,426,089 B1 | 7/2002 | Sunohara et al. | |
| 6,428,830 B1 | 8/2002 | Matthews et al. | |
| 6,440,473 B2 | 8/2002 | Geromini et al. | |
| 6,485,802 B1 | 11/2002 | Hammer et al. | |
| 6,610,783 B2 | 8/2003 | Delius et al. | |
| 6,613,372 B1 | 9/2003 | Schlebusch et al. | |
| 6,623,773 B2 | 9/2003 | Meier et al. | |
| 6,627,282 B2 | 9/2003 | Hammer et al. | |
| 6,656,547 B2 | 12/2003 | Hammer et al. | |
| 6,660,315 B2 | 12/2003 | Miller et al. | |
| 6,667,082 B2 | 12/2003 | Bamore et al. | |
| 6,703,058 B1 | 3/2004 | Hammer et al. | |
| 6,749,912 B2 | 6/2004 | Delius et al. | |
| 6,761,944 B1 | 7/2004 | Hammer et al. | |
| 6,797,100 B1 | 9/2004 | Gord et al. | |
| 6,805,890 B2 | 10/2004 | Wu et al. | |
| 6,808,771 B2 | 10/2004 | Auf Der Heide et al. | |
| 6,817,850 B2 | 11/2004 | Kobayashi et al. | |
| 6,821,588 B1 | 11/2004 | Hammer et al. | |
| 6,821,591 B2 | 11/2004 | Gord et al. | |
| 6,827,957 B2 | 12/2004 | Paluch et al. | |
| 6,902,783 B1 | 6/2005 | Hammer et al. | |
| 6,919,112 B2 | 7/2005 | Delius | |
| 7,001,547 B2 | 2/2006 | Rasmussen | |
| 7,001,635 B2 | 2/2006 | Merritt, II et al. | |
| 7,011,858 B2 | 3/2006 | Grolig et al. | |
| 7,022,357 B2 | 4/2006 | Krallmann et al. | |
| 7,044,845 B2 | 5/2006 | Coutandin et al. | |
| 7,156,635 B2 | 1/2007 | Matson et al. | |
| 7,172,783 B2 | 2/2007 | Murray et al. | |
| 7,189,667 B1 | 3/2007 | Mans et al. | |
| 7,244,171 B2 | 7/2007 | Muller et al. | |
| 7,252,847 B2 | 8/2007 | Keller et al. | |
| 7,264,836 B2 | 9/2007 | McHugh et al. | |
| RE39,943 E | 12/2007 | Kobussen et al. | |
| 7,306,449 B2 | 12/2007 | Huang | |
| 7,306,511 B2 | 12/2007 | Whittlesey et al. | |
| 7,337,708 B2 | 3/2008 | Rothamel et al. | |
| 7,754,258 B2 | 7/2010 | Morgan et al. | |
| 7,906,623 B2 | 3/2011 | Norwood et al. | |
| 2002/0039611 A1 | 4/2002 | Grolig et al. | |
| 2002/0058102 A1 | 5/2002 | Makela et al. | |
| 2002/0064580 A1 | 5/2002 | Gord et al. | |
| 2002/0088735 A1 | 7/2002 | Weinheimer et al. | |
| 2003/0031765 A1 | 2/2003 | Luthra et al. | |
| 2003/0062649 A1 | 4/2003 | Hammer et al. | |
| 2004/0091586 A1 | 5/2004 | Hammer et al. | |
| 2004/0130060 A1 | 7/2004 | Hammer et al. | |
| 2004/0142127 A1 | 7/2004 | Delius et al. | |
| 2004/0166209 A1 | 8/2004 | Gord et al. | |
| 2004/0219264 A1 | 11/2004 | Schafer | |
| 2004/0247752 A1 | 12/2004 | Koenig et al. | |
| 2005/0031741 A1 | 2/2005 | Morgan et al. | |
| 2005/0106294 A1 | 5/2005 | Stalberg et al. | |
| 2005/0112247 A1 | 5/2005 | Stalberg et al. | |
| 2005/0126403 A1 | 6/2005 | Arias Lopez | |
| 2005/0129813 A1 | 6/2005 | Koenig et al. | |
| 2005/0186309 A1 | 8/2005 | Gord et al. | |
| 2005/0202130 A1 | 9/2005 | Auf Der Heide et al. | |

(56) References Cited

U.S. PATENT DOCUMENTS

| | | |
|---|---|---|
| 2005/0220946 A1 | 10/2005 | Torcatis |
| 2006/0003058 A1 | 1/2006 | Koenig et al. |
| 2006/0051466 A1 | 3/2006 | Delius et al. |
| 2006/0057258 A1 | 3/2006 | Dinh-Sybeldon et al. |
| 2006/0073245 A1 | 4/2006 | Hammer et al. |
| 2006/0110502 A1 | 5/2006 | Auf Der Heide et al. |
| 2006/0127538 A1 | 6/2006 | Appleby |
| 2006/0134279 A1 | 6/2006 | Rieser et al. |
| 2006/0153953 A1 | 7/2006 | Gord et al. |
| 2006/0182851 A1 | 8/2006 | Kastl |
| 2006/0188615 A1 | 8/2006 | Wilfer et al. |
| 2006/0202397 A1 | 9/2006 | Stalberg et al. |
| 2006/0233985 A1 | 10/2006 | Pockat et al. |
| 2006/0234611 A1 | 10/2006 | Delius et al. |
| 2006/0240207 A1 | 10/2006 | Tobben et al. |
| 2006/0251773 A1 | 11/2006 | Auf Der Heide et al. |
| 2006/0257532 A1 | 11/2006 | Lample et al. |
| 2006/0269705 A1 | 11/2006 | Niederstaetter et al. |
| 2006/0286913 A1 | 12/2006 | Niederstaetter et al. |
| 2007/0014899 A1 | 1/2007 | Wolf |
| 2007/0031542 A1 | 2/2007 | Chu et al. |
| 2007/0031620 A1 | 2/2007 | Auf Der Heide et al. |
| 2007/0087100 A1* | 4/2007 | Fornaguera .......... A23G 3/0021 426/516 |
| 2007/0154601 A1 | 7/2007 | Foegler et al. |
| 2007/0160783 A1 | 7/2007 | Rieser et al. |
| 2007/0166489 A1 | 7/2007 | Foegler et al. |
| 2007/0172558 A1 | 7/2007 | Hammer et al. |
| 2007/0190210 A1 | 8/2007 | Koenig et al. |
| 2007/0202222 A1 | 8/2007 | Koenig et al. |
| 2008/0003336 A1 | 1/2008 | Schafer |
| 2008/0003338 A1 | 1/2008 | Barnvos et al. |
| 2008/0018013 A1 | 1/2008 | Mori et al. |
| 2008/0020105 A1 | 1/2008 | Rieser et al. |
| 2008/0057235 A1 | 3/2008 | Foegler et al. |
| 2008/0069985 A1 | 3/2008 | Seelgen et al. |
| 2008/0145576 A1 | 6/2008 | Koenig et al. |
| 2008/0182035 A1 | 7/2008 | Samuels |
| 2008/0187735 A1 | 8/2008 | Hammer et al. |
| 2008/0226853 A1 | 9/2008 | Bueker et al. |
| 2008/0233246 A1 | 9/2008 | Hammer et al. |
| 2008/0248268 A1 | 10/2008 | Delius et al. |
| 2008/0261500 A1 | 10/2008 | Fogler et al. |
| 2008/0274237 A1 | 11/2008 | Hammer et al. |
| 2008/0280021 A1 | 11/2008 | Hammer et al. |
| 2009/0029012 A1 | 1/2009 | Foegler et al. |
| 2009/0136696 A1 | 5/2009 | Faltermeier et al. |
| 2009/0155430 A1 | 6/2009 | Lee et al. |
| 2009/0162502 A1 | 6/2009 | Bueker et al. |
| 2009/0191315 A1 | 7/2009 | Delius |
| 2009/0211711 A1 | 8/2009 | Auf Der Heide et al. |
| 2009/0226557 A1 | 9/2009 | Etayo Garralda et al. |
| 2009/0288791 A1 | 11/2009 | Hammer et al. |
| 2010/0015299 A1 | 1/2010 | Borst et al. |
| 2010/0034932 A1 | 2/2010 | Schmidt et al. |
| 2010/0047400 A1* | 2/2010 | Carlson et al. ................. 426/92 |
| 2010/0047417 A1 | 2/2010 | Wilfer |
| 2010/0104691 A1* | 4/2010 | Bouvier ............... A21C 11/163 426/19 |
| 2010/0129505 A1 | 5/2010 | Hayes et al. |
| 2011/0142994 A1 | 6/2011 | Buwalda et al. |
| 2013/0064951 A1* | 3/2013 | Haines ................ A23G 1/0056 426/516 |

FOREIGN PATENT DOCUMENTS

| | | | |
|---|---|---|---|
| EP | 0580232 A1 | 1/1994 | |
| EP | 0720816 B1 | 7/1996 | |
| EP | 0741973 B1 | 11/1996 | |
| GB | 807863 A | 1/1959 | |
| GB | 1232801 A | 5/1971 | |
| GB | 1288111 A | 9/1972 | |
| JP | 63-022167 | 1/1988 | |
| JP | 01-117759 | 5/1989 | |
| WO | 93/12660 A1 | 7/1993 | |
| WO | 99/22600 A1 | 5/1999 | |
| WO | WO 9922600 A1 * | 5/1999 | ............. A22C 11/02 |
| WO | 99/60870 A1 | 12/1999 | |

OTHER PUBLICATIONS

International Search Report for PCT/US2011/054239, Apr. 19, 2012, 4 pages.

* cited by examiner

SYSTEMS AND METHODS FOR FOOD PRODUCT EXTRUSION

TECHNICAL FIELD

The present disclosure relates generally to the field of food product extrusions, and more specifically to food products extrusions such as sausage products and similar products where a thin meat or similar layer is used as a carrier for one or more inclusions.

BACKGROUND

There are many challenges associated with providing food products having multiple components and/or one or more layers, where one or more of the components or layers act as a carrier for one or more inclusions for the food product.

Accordingly, various embodiments disclosed herein are directed to improved systems and methods for food product extrusions and similar food products.

SUMMARY

One embodiment relates to a system for producing food products. The system comprises an extruder, an inner tube through which a first component is extruded, an outer tube provided about the inner tube to define a first annular space through which a second component is extruded, and a collagen head configured to apply a layer of collagen gel over the second component. At least one of the inner tube, the outer tube, a first flow rate at which the first component is extruded via the extruder through the inner tube, and a second flow rate at which the second component is extruded via the extruder through the outer tube is configured such that an initial diameter of the first component exiting the inner tube is substantially smaller than a final diameter of the first component, and an initial thickness of the second component exiting the outer tube is substantially greater than a final thickness of the second component.

Another embodiment relates to a method of making a food product. The method comprises extruding a first component, extruding a second component surrounding the first component, and applying a layer of casing material to the second component. The first and second components are extruded such that an initial diameter of the first component is substantially less than a final diameter of the first component, and an initial thickness of the second component is substantially greater than a final thickness of the second component.

Still another embodiment relates to a food product. The food product comprises a first extruded component, a second extruded component surrounding the first extruded component, and an outer layer surrounding the second extruded component. Moreover, the second extruded component comprises a carrier and inclusions carried by the carrier, the inclusions comprising particulates sized such that the inclusions have a greater diameter or width than a thickness of the second component.

Yet another embodiment relates to a system for producing food products. The system comprises an inner tube configured to extrude a first component, and an outer tube provided about the inner tube to define an annular space through which a second component is extruded. The inner tube and the annular space defined by the inner and outer tubes are sized such that an initial diameter of the first component exiting the outlet is substantially smaller than a final diameter of the first component, and an initial thickness of the second component exiting the outlet is substantially greater than a final thickness of the second component

DETAILED DESCRIPTION

Referring to the FIGURES generally, various embodiments disclosed herein relate to food products (e.g., stuffed, extruded, co-extruded, and/or tri-extruded food products, etc.) and systems and methods for making such food products. As used herein, the term "food product" includes, but is not limited to, whole, ground, blended, and/or emulsified protein based products (e.g., meat, non-meat such as soy, etc. in a variety of forms such as links or rings (e.g., sausage, bratwurst, hot dogs, wieners, lunchmeat, etc.) generally having a collagen, cellulose, or other casing or outer layer, whether edible or stripped/discarded. The term "extruded food product" includes food products with a single or multiple extruded components so as to include food products made by simultaneously extruding (e.g., co-extruding, tri-extruding, etc.) more than one food component. As used herein, "about" will be understood by persons of ordinary skill in the art and will vary to some extent based upon the context in which it is used. If there are uses which are not clear to persons of ordinary skill in the art, given the context in which it is used, "about" will mean up to plus or minus 25% of the particular term.

Some embodiments herein relate to an extruded food product having an inner meat component, and a relatively thin middle component comprising a heat settable and flowable carrier (e.g., a meat emulsion, etc.) that carries one or more inclusions, and an outer layer (e.g., a collagen layer) forming a casing that is applied over the thin middle component. The food product may provide the visual appearance of a hand-rubbed, or rolled-on topical spice or additive that is visible through the outer layer.

Systems and methods utilized to produce such food products include extrusion systems having inner and outer tubes. Food components are extruded through the inner and outer tubes (e.g., through the inner tube and through an annular space defined between the inner and outer tubes). In some embodiments, the size of the annular space, or gap, defined by the inner and outer tubes is substantially larger than that used in traditional coextrusion processes, which use a substantially smaller gap and therefore are more limited in terms of particulate size of inclusions. Upon exiting the tubes, the inner component "mushrooms," or expands in diameter, while the thin middle component thins, or reduces in thickness. Due to the larger size of the annular space between the inner and outer tubes, the middle component may include inclusions that are of a size larger than that which can be accommodated with traditional extrusion systems, and yet the food product may still have a relatively thin middle component over the inner, or main extruded component. An outer layer (e.g., collagen gel, alginate gel, combinations thereof) may be extruded or otherwise provided over the middle component (e.g., as a pre-formed casing such as a natural, cellulose, collagen, or other casing into which the inner and middle components may be "stuffed"). In some embodiments, the inner and/or outer tubes may be coupled to a nozzle portion, and the nozzle portion may have dimensions similar or different from the inner and/or outer tubes. It should be noted, however, that other methods and/or apparatuses (instead of a nozzle portion) may be used to effectuate extrusion from or via the inner and/or outer tubes.

Figure 1A:
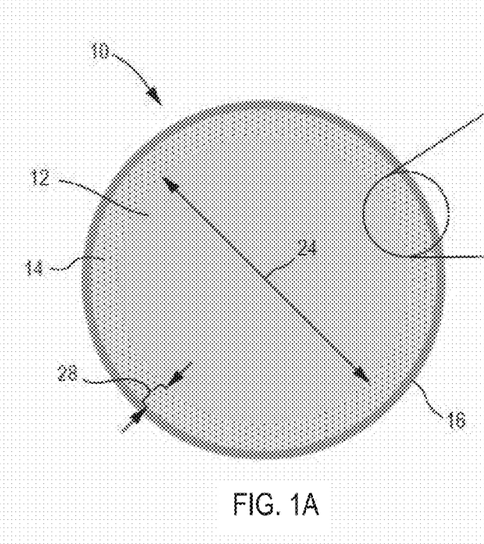
FIGS. 1A-1C are various schematic representations of a food product according to an exemplary embodiment.
Figure 1B:
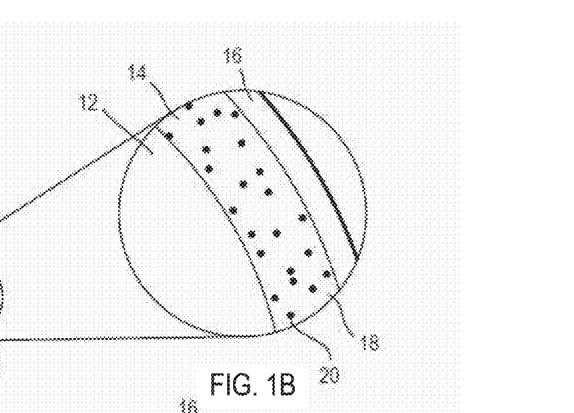
Figure 1C:
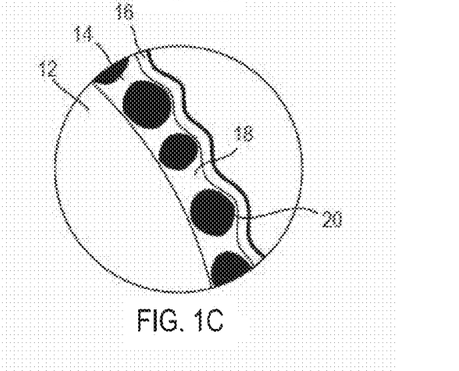
Figure 8A:
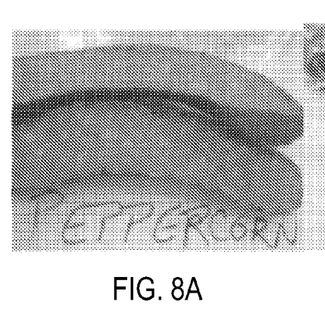
FIGS. 8A-8C show first, second, and third extruded food products, respectively, according to exemplary embodiments.
Figure 8B:
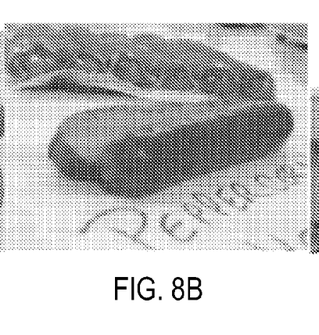
Figure 8C:
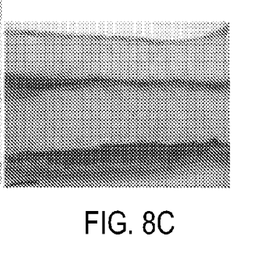

Referring now to FIGS. 1A-1C, a food product 10 is shown according to an exemplary embodiment. As shown in FIG. 1A, food product 10 includes a first, or inner layer or component 12 (e.g., a base layer, primary layer, etc.), a second, or middle layer or component 14 (e.g., an inclusion or emulsion layer, a combination carrier and inclusion layer, a layer including one or more of a flavoring, sauce, spice, coloring, and textural additive, etc.), and a third, or outer layer or component 16 (e.g., a collagen layer or gel, an alginate layer or gel, a collagen/alginate hybrid layer or get, a pre-formed outer casing, etc.). Food product 10 may include any of a variety of food products, including sausages, bratwurst, hot dogs, breakfast sausage, lunchmeat, etc. For example, food product 10 may be a cooked or raw peppercorn beef rope (FIG. 8A), peppercorn beef hot dog (FIG. 8B), buffalo chicken rope (FIG. 8C), etc.

According to an exemplary embodiment, first component 12 is a protein-based material such as meat, soy, etc., and may be provided in a variety of forms (e.g., chunk, ground, emulsified, sliced, comitrolled, pulled, dough, whole muscle, combinations thereof, etc.). First component 12 may include inclusions such as food particles (e.g., cheese, seasonings, spices, grains, etc.), colorings, liquid smoke or other flavorings or additives, etc. In some embodiments, first component 12 is a meat blend including more than one type of meat, or alternatively, meats having a different formula, such as, e.g., meats having a different texture, color, taste, salt content, seasoning/spice content, etc.

Referring now to FIGS. 1B and 1C, second component 14 includes a carrier 18 and inclusions 20 according to an exemplary embodiment. Carrier 18 may be a protein-based material such as meat, soy, collagen, etc., and may be provided in dough, liquid, and/or ground form, or any of the forms discussed with respect to first component 12. Inclusions 20 may include topicals, particulates, and/or additives such as food particles (e.g., sundried tomatoes, flaked basil, pepper, spices, etc.), colorings, flavorings (e.g., salt, seasoning, liquid smoke etc.), combinations thereof, and the like. Second component 14 my be the same or a different type of food product from first component 12 (e.g., to provide a different texture, flavor, color, etc., from first component 12). In one embodiment, second component 14 includes the same type of meat blend as first component 12, but includes additional inclusions such as spices, flavorings, particulates, etc. As such, the first and second components may be used in combination to provide a meat product with a thin outer layer of inclusions (e.g., meat, spices, etc.) that provide the visual appearance of a rubbed-in topical spice, flavoring, etc. It should be noted that in accordance with certain embodiments, the second component need not necessarily include relatively larger-sized particulate inclusions, instead being particulate-less, or having small inclusions, such as spices, or coloring, for example, while the first component may, as previously described, have larger-sized inclusions, while still resulting in a hand-rubbed, or rubbed-on appearance/texture. Carrier 18 may be a ground, emulsified, pulled, or other meat (e.g., ground beef, poultry, pork, lamb, goat, or combinations thereof etc.). According to an exemplary embodiment, carrier 18 is a flowable, heat-settable layer such as a meat emulsion or fluid layer (e.g., a fluid meat carrier, emulsion, blend, etc.) and is configured to provide a carrier material for inclusions 20. Second component 14 may be of a different consistency (e.g., grind, texture, etc.) than first component 12. For example, first component 12 may be a course ground (e.g., chunks, pieces, etc.) and second component 14 may be emulsified or finely ground.

Outer layer 16 provides a casing for food product 10, and may be a collagen layer or gel, an alginate layer or gel, a collagen/alginate hybrid layer or gel, a preformed casing such as a natural or other preformed casing, or similar material. In one embodiment, outer layer 16 is a settable gel or coating configured to set upon the application of heat, a chemical bath, liquid smoke, and/or combinations thereof, etc. In some embodiments, the outer layer includes inclusions such as colorings, spices, particulates, or combinations thereof, etc. Outer layer 16 is configured to be transparent or translucent such that inclusions 20 in second component 14 are visible through the outer layer. Outer layer 16 may also permit inclusions 20 contained in carrier 18 of second component 14 to "bulge" under the outer layer, providing an outer layer or casing with a surface contour conforming to the inclusions below the outer layer (see FIGS. 1B-1C). Furthermore, outer layer 16 may provide a pronounced "bite" for users (e.g., a "snap bite," etc.), which may be desirable with certain food products.

Referring now to FIGS. 3A-6C, a system and method for making a food product such as food product 10 is shown in greater detail. According to an exemplary embodiment, an extrusion system 40 for making food products includes a first inlet 42, a second inlet 44, a head portion 46, and an outlet, or exit 48 (e.g., a nozzle, etc.) (see FIG. 3A). An inner tube 50 and an outer tube 52 extend from first and second inlets 42, 44 to exit 48 and define an annular space 58 therebetween (see FIGS. 3B, 4A-4D, 5A-5C, and 6A).

Figure 6A:
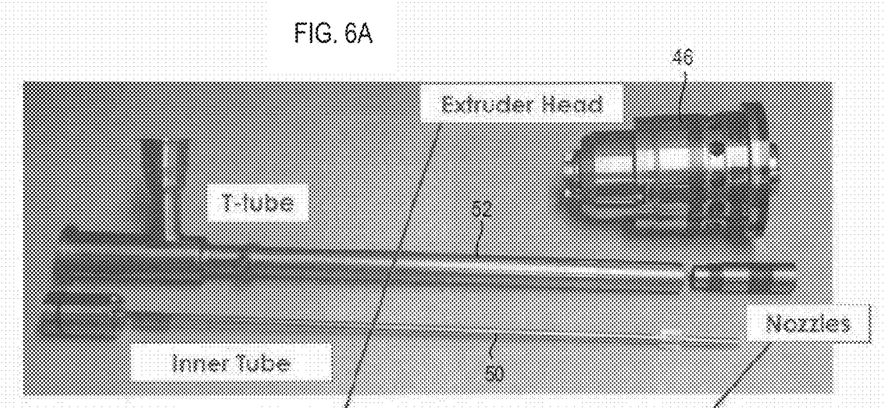
FIGS. 6A-6C show detailed views of various components of the system of FIG. 3A according to an exemplary embodiment.
Figure 6B:
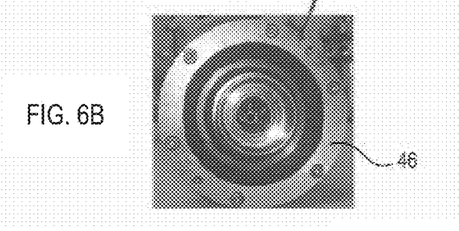

First inlet 42 is configured to receive a first food component such as first component 12. Tube 50 guides the first food component toward exit 48. Second inlet 44 is configured to receive a second food component such as second component 14. Annular space 58 guides the second component toward exit 48. Adjacent exit 48, head portion 46 (e.g., a collagen applicator such as a collagen head, etc.) is configured to apply extrude, etc.) a collagen gel or other suitable material to the surface of the second food component as it exits outlet 48 (see FIGS. 3A, 6A and 6B). According to an exemplary embodiment, head portion 46 applies or deposits collagen to the surface of second component 14 in a linear and/or radial manner, e.g., in a direction angled to or generally perpendicular to the direction of flow of first and second components 12, 14 through the extrusion system. Upon exiting from outlet 48, the food product may be directed to a conveyor belt or other system for further processing, conditioning, packaging, etc.

First and second inlets 42, 44 and head 46 may include or be coupled to one or more hoppers, pumps, grinders, and/or similar mechanisms configured to receive food product and/or collagen or other materials and force or extrude the materials through inner tube 50 and annular space 58. The flow rate, i.e. the rate at which the first and second components are extruded may be varied depending on the desired characteristics of the final product. For example, by increasing/decreasing the flow rates at which the first/second food components are extruded, the relative proportions of the first and second food components in the final food product may be varied.

Figure 3A:
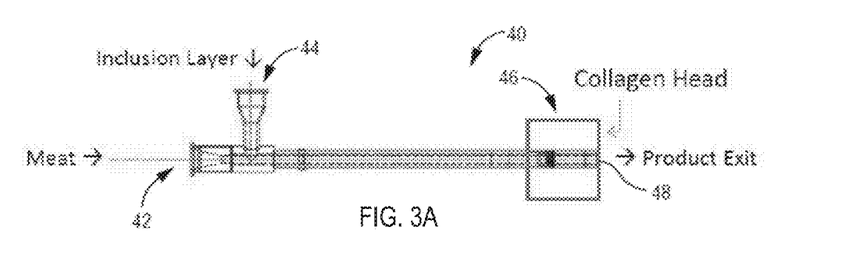
FIGS. 3A-3B are side and frontal schematic representations, respectively, of a system for making the food product of FIG. 1 according to an exemplary embodiment.
Figure 3B:
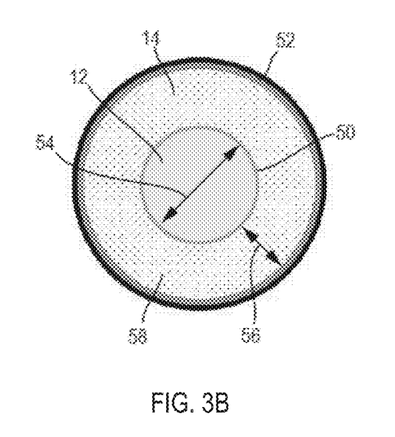
Figure 3C:
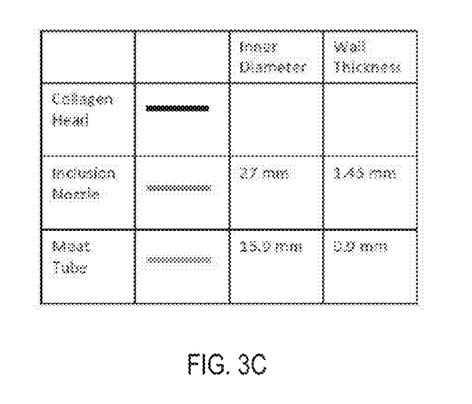
FIG. 3C is a table indicative of inner diameter and wall thickness of various elements of a system for making the food product of FIG. 1 according to an exemplary embodiment.
Figure 4A:
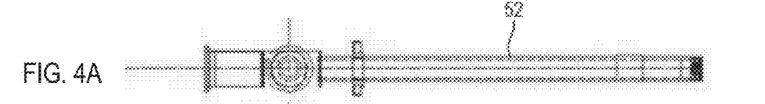
FIGS. 4A-4D show top, side and bottom views of various components of the system of FIG. 3A according to an exemplary embodiment.
Figure 4B:
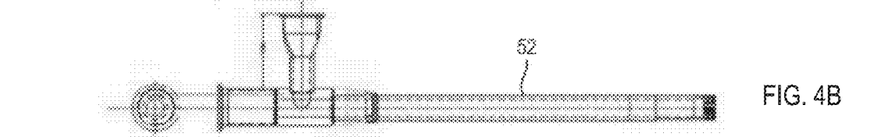
Figure 4C:
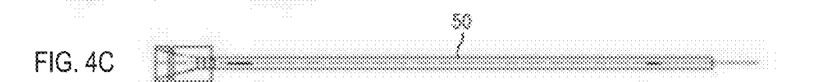
Figure 4D:
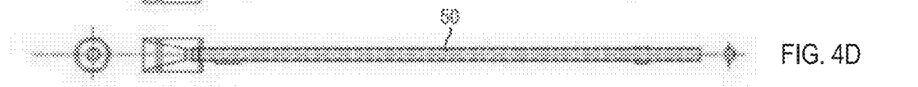
Figure 5A:
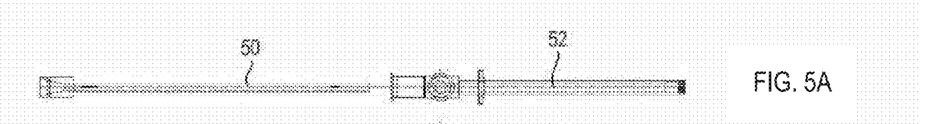
FIGS. 5A-5C show top and side views of the assembly and interaction of various components of the system of FIG. 3A according to an exemplary embodiment.
Figure 5B:
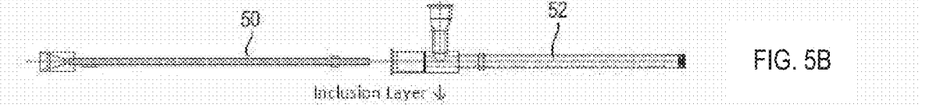
Figure 5C:
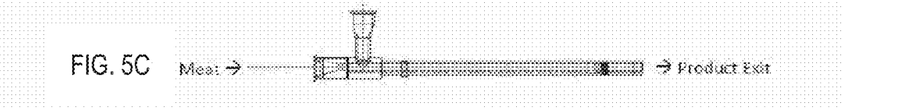

As shown in FIG. 3B, inner tube 50 has a diameter 54, and annular space 58 has a "thickness" 56 (e.g., the radial distance defined between the inner and outer tubes). According to one embodiment, diameter 54 is approximately 16 mm and thickness 56 is approximately 5 mm (see FIG. 3C). According to various other embodiments, diameter 54 and thickness 56 may take other dimensions. In various alternative embodiments, diameter 54 and thickness 56 and/or flow rates may be varied to provide food products with particular relative portions/characteristics of first and second food products.

The diameters of inner tube 50 and outer tube 52 may be proportionately related to provide a desired final size of first component 12 and a desired thickness of second component 14. In one embodiment, inner tube 50 has a diameter that is about 50% of the diameter of outer tube 52. In other embodiments, inner tube 50 has a diameter that is between about 45-55%, between about 40-60%, or between about 35 to 65% of the inner diameter of outer tube 52. The ratio of the diameters of the inner outer tubes may further differ according to various other exemplary embodiments.

Figure 6C:
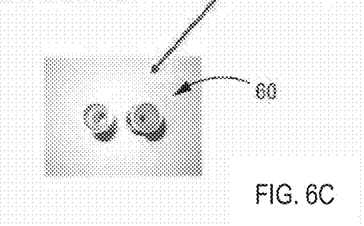
Figures 7A, 7B, 7C:
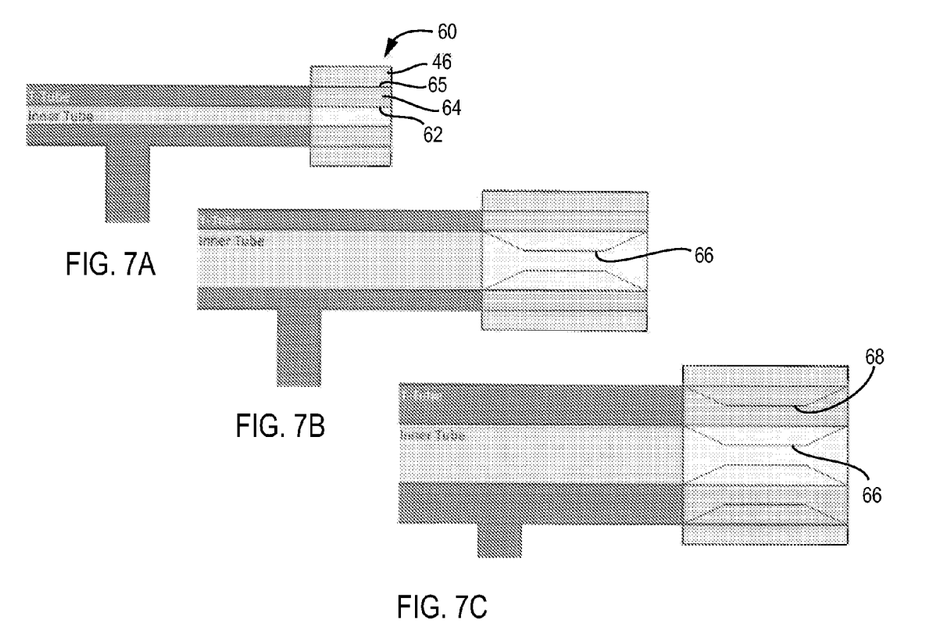
FIGS. 7A-7C illustrate first, second, and third alternative outlets or nozzles, respectively, for extrusion systems according to exemplary embodiments.

According to an exemplary embodiment, outlet 48 is provided by way of a separate nozzle such as nozzle 60 shown in FIGS. 6C and 7A. Nozzle 60 includes an inner tube 62 and an outer tube 65 (which may be embodiments of inner tube 50 and outer tube 52, respectively) that define an annular space 64. As shown in FIG. 7A, the nozzle may have an annular space generally corresponding in size to those provided by inner and outer tubes 62, 65, with the collagen head 46 provided to the outside of the inner and outer tubes 62, 65, of the nozzle 60. Thus, any dimensions or variations in dimensions relating to inner and outer tubes 62, 65, may be equally applicable to the configuration of the nozzle. According to various alternative embodiments, inner tube 62 and annular space 64 may be sized differently from those provided by inner and outer tubes 50, 52. Referring to FIGS. 7B and 7C, in some embodiments, inner tube 62 (FIG. 7B) or inner tube 62 and outer tube 65 (FIG. 7C) of nozzle 60 may include a restriction portion 66, 68, where the inner diameter of inner tube 62 and/or outer tube 65 may be decreased. According to yet further embodiments, the extrusion system may be configured such that a separate nozzle is not utilized, or the nozzle is an integrated portion of the inner and/or outer tubes (e.g., part of a unitary tube structure). In other embodiments, a separate nozzle may be utilized with only one of the inner and outer tubes. The inner and outer tubes may be formed with any of the dimensional features of the separate nozzles discussed herein. As such, according to various embodiments, food product may exit the extrusion system via the inner and outer tubes, in conjunction with a nozzle or alternative extrusion mechanism, or without the use of a nozzle, where the exit aspect of the system can be defined by the inner and outer tubes themselves.

Figure 2A:
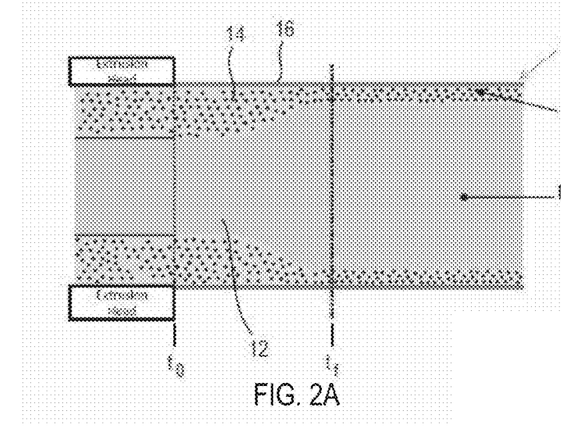
FIGS. 2A-2B are side and frontal schematic representations, respectively, of a food product being extruded according to an exemplary embodiment.
Figure 2B:
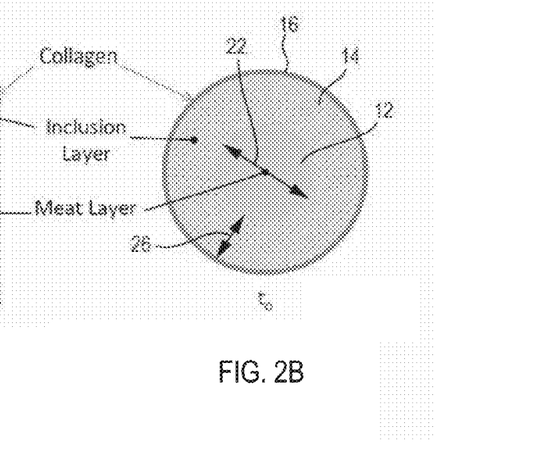

According to an exemplary embodiment, first and second components 12, 14 are extruded at rates such that, upon initially exiting outlet (e.g., at $t_0$ shown in FIGS. 2A-2B), first component 12 has an initial diameter 22 and second component 14 has a thickness 26. After exiting the extrusion system, the relative sizes of diameter 22 and thickness 26 change over time upon exiting from the extrusion system/nozzle. In some embodiments, inner and outer tubes 50, 52 are sized such that upon exiting outlet 48, first component 12 substantially increases in diameter, and second component 14 substantially decreases in thickness. For example upon exiting inner tube 50, first product 12 expands (e.g., mushrooms, etc.) from initial diameter 22 (see, e.g., FIG. 2B) to a final diameter 24 (see, e.g., FIG. 1A) after a certain period of time (e.g., at shown in FIG. 2A). Upon second component 14 exiting annular space 58, the thickness of second component 14 decreases from initial thickness 26 (see, e.g., FIG. 2B) to a final thickness 28 (see, e.g., FIG. 1A) to form a thin layer or covering over first component 12.

According to an exemplary embodiment, the diameter of first food product 12 can increase anywhere from, e.g., 20% to 60% from initial diameter 22 to final diameter 24, and the thickness of second component 14 can decrease by anywhere from, e.g., 40% to 60% from initial thickness 26 to final thickness 28. In still further embodiments, the thickness of second component 14 can decrease by at least about 67% (by approximately two-thirds of the original thickness) from initial thickness 26 to final thickness 28. For example, in one embodiment, the diameter of first component 12 increases from about 16 mm to over 25 mm, and the thickness of second component 14 decreases from about 5 mm to about 2 mm. In another embodiment, the diameter of first component 12 increases from about 16 mm to about 30 mm, and the thickness of second component 14 decreases from about 9 mm to about 3 mm. According to various other embodiments, the diameter of first food component 12 and the thickness of second component 14 may increase/decrease by other amounts to provide food products of varying relative proportions.

According to an exemplary embodiment additives 20 carried by carrier 18 of second component 14 are sized such that, upon the thickness of second component 14 decreasing upon exiting annular space 58, at least some of inclusions 20 may have a diameter (or other dimension such as width, in the case of non-circular inclusions) that exceeds the final thickness of carrier 18. As such, the inclusions may appear to "poke out" from the food product. Extruding food components in this matter enables the extrusion of food components such as second food component 14 having inclusions of such a size that would typically not be extrudable due to the size of the inclusions exceeding the size of the annular extrusion space.

Figure 9:
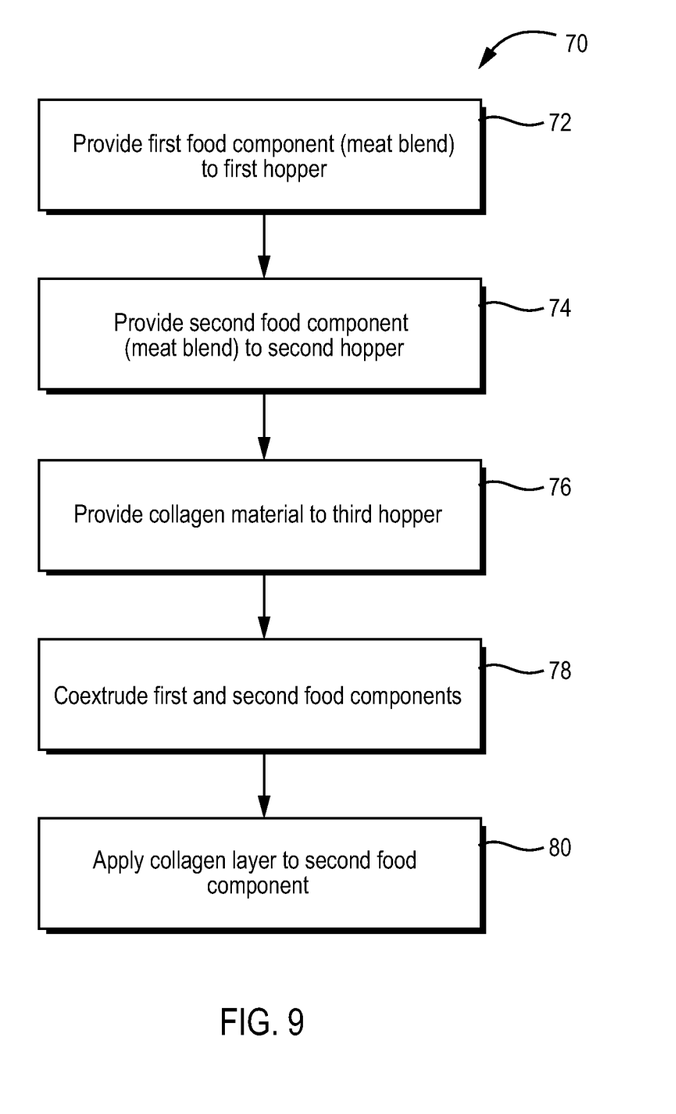
FIG. 9 illustrates a method of making the food product of FIG. 1 according to an exemplary embodiment.

Referring now to FIG. 9, a method of making an extruded food product is shown according to an exemplary embodiment. First, a first food component is provided to a first hopper (step 72). The first food component may be a meat blend and/or similar to first food component 12. Next, a second food component is provided to a second hopper (step 74). The second food component may be a meat carrier with inclusions such as inclusions 20. An outer layer material such as a collagen material is then provided to a third hopper (step 76). The first and second food components are co-extruded (step 78), for example, using a system such as system 40. The outer layer material is then applied to the surface of the second food component to form a casing for the food product (step 80). The food product may subsequently undergo additional processing, conditioning, etc. According to various alternative embodiments, additional steps may be included at various points during the manufacturing process.

As a first example, a food product such as a pepper encrusted beef link is produced using the systems and methods herein. A first, inner component includes a meat blend (e.g., beet) ground to about 3.9 mm and may include inclusions such as cheese, seasonings, etc. (typically smaller than 1 cm). A second, middle component is coextruded with the first component, and includes a carrier of ground meat (ground through a 3.2 mm plate) and inclusions (e.g., 50% black pepper and 50% red bell pepper). The black pepper may have particle sizes of between 0.8 and 1.7 mm, and the bell pepper may have particle sizes between 0.4 and 2.8 mm. A collagen layer is applied to the outside of the second component.

During the extrusion process, the first component has a flow rate of 5600 lbs/hr, the second component has a flow rate of 2400 lbs/hr, and the collagen layer has a flow rate of 400 lbs/hr. The inner tube has an inner diameter of 15.9 mm and a wall thickness of 0.9 mm, and the outer tube has an inner diameter of 27 mm and a wall thickness of 1.45 mm (although as can be appreciated, the wall thickness of the outer tube need not have an effect on flow rate/annular size). The collagen head has an inner diameter of 28.5 mm. The final food product has an outside diameter of 27 mm, with the thickness of the collagen layer being negligible. Thus, the outer diameter of the second component is approximately 27 mm, the outer diameter of the first component is 22.6 mm, and the thickness of the second component is 2.2 mm. The weight of the final food product is 70% first food component, 30% second food component, with the weight of the collagen layer being negligible.

In a second example, a food product such as a chicken sausage rope flavored with sundried tomato and basil is produced using the systems and methods described herein. A first, inner component includes a meat (e.g., chicken) blend ground to about 3.9 mm and may include inclusions such as cheese, seasonings, etc. (typically smaller than 1 cm). A second, middle component is coextruded with the first component, and includes a carrier of ground meat (ground to 3.2 mm) and inclusions (e.g., 60% sundried tomato particles and 40% flaked basil). The sundried tomato may have particle sizes of between 0.4 and 2.8 mm). A collagen layer is applied to the outside of the second component.

During the extrusion process, the first component has a flow rate of 5600 lbs/hr, the second component has a flow rate of 2400 lbs/hr, and the collagen layer has a flow rate of 400 lbs/hr. The inner tube has an inner diameter of 15.9 mm and a wall thickness of 0.9 mm, and the outer tube has an inner diameter of 36 mm and a wall thickness of 1.45 mm. The collagen head has an inner diameter of 37.5 mm. The final food product has an outside diameter of 36 mm, with the thickness of the collagen layer being negligible. Thus, the outer diameter of the second component is approximately 36 mm, the outer diameter of the first component is 30 mm, and the thickness of the second component is 3 mm. The weight of the final food product is 70% first food component, 30% second food component, with the weight of the collagen layer being negligible.

These examples show a product with a large particulate or inclusion carried in a thin layer of meat, which would not have been possible using the known traditional coextrusion processes and equipment.

It should be noted that while the various embodiments disclosed herein generally relate to a food product with first and second components extruded with an outer layer, many variations may be made within the scope of the present disclosure. For example, additional components may be extruded within the outer layer (e.g., collagen/casing layer) to surround the second component, for example. Further, while the first and second components have generally been described as being meat-based, other food types may be used, such as soy, rice, corn masa, other grains, dough products, blends thereof, etc. Further yet, while in some embodiments the final food product includes a relatively thicker primary food product surrounded by a relatively thinner middle layer, in other embodiments, the flow rate of the extrusion system may be controlled to change the relative proportions of the inner and middle food products (e.g., by increasing the extrusion flow rate of the middle component and decreasing the extrusion flow rate of the inner component, the middle component may "mushroom" upon exiting the extrusion system and provide a relatively thicker layer than shown, for example, in FIGS. 1A-1C, and 2A-2B). This can allow for, e.g., the inclusion of larger particulates or other additives within a relatively small inner layer.

The system and methods disclosed herein may provide benefits over more traditional systems and methods. For example, the systems and methods provide a food product with a thin, outer layer having inclusions without the need for hand rubbing spices, etc. onto the food product and/or rolling the food product within spices, etc. The methods disclosed herein may thus provide more efficient and safe methods, with reduced labor, mess, and/or waste as compared to more conventional techniques, where sausages may be cooked in a package, stripped from the package, rubbed in a topical seasoning, etc., repackaged, and pasteurized or subjected to other further processing. Further, the extruded food product may provide sausage links or similar food products with a pronounced "bite" while maintaining the topical seasonings, etc. visible and near the surface.

It is important to note that the construction and arrangement of the elements of the food products and/or methods as shown in the exemplary embodiments are illustrative only. Although a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the various embodiments. Accordingly, all such modifications are intended to be included within the scope of the present disclosure as defined in the appended claims. The order or sequence of any process or method steps may be varied or re-sequenced according to alternative embodiments. Other substitutions, modifications, changes, and/or omissions may be made in the design, operating conditions, and arrangement of the exemplary embodiments without departing from the spirit of the present disclosure.

What is claimed is:

1. A method of making a food product, comprising:
    extruding a first component through a first outlet at a first flow rate;
    extruding a second component surrounding the first component through a second outlet at a second flow rate, wherein the second flow rate is less than the first flow rate; and
    applying a layer of casing material to the second component;

wherein the first and second components are extruded such that an initial diameter of the first component exiting the first outlet is less than a final diameter of the first component, and an initial thickness of the second component exiting the second outlet is greater than a final thickness of the second component;

and wherein the second component has a plurality of inclusions, the inclusions being of a size smaller than the second outlet but larger than the final thickness of the second component.

2. The method of claim 1, wherein:

extruding the first component comprises extruding a first meat carrier component having an additive provided therein, the additive comprising at least one of food particles, condiments, coloring, liquid smoke, flavorings, spices, or combinations thereof; and extruding the second component comprises extruding a second meat carrier component having the plurality of inclusions provided therein, the plurality of inclusions comprising at least one of additional food particles, additional condiments, additional colorings, additional liquid smoke, additional flavorings, additional spices or combinations thereof, the second meat carrier component comprising one of an additional portion of the first meat carrier component or a different meat carrier component.

3. The method of claim 2, wherein the plurality of inclusions protrude from the second meat carrier and bulge under the casing material.

* * * * *